United States Patent
Long et al.

(10) Patent No.: US 7,527,338 B2
(45) Date of Patent: May 5, 2009

(54) HYDRODYNAMIC RETARDER CONTROL APPARATUS

(75) Inventors: Charles F. Long, Pittsboro, IN (US); Mark A. Rader, Avon, IN (US); Bradley L. McCafferty, Zionsville, IN (US)

(73) Assignee: General Motors Corporation, Detroit, MI (US)

( * ) Notice: Subject to any disclaimer, the term of this patent is extended or adjusted under 35 U.S.C. 154(b) by 496 days.

(21) Appl. No.: 11/218,981

(22) Filed: Sep. 2, 2005

(65) Prior Publication Data

US 2007/0052288 A1    Mar. 8, 2007

(51) Int. Cl.
*B60T 13/74*    (2006.01)

(52) U.S. Cl. .......................... 303/3; 303/84.1; 188/290

(58) Field of Classification Search .................. 303/3, 303/20, 84.1; 188/290–296, 151 R, 274, 188/264 E, 264 P, 264 R, 264 D; 192/215, 192/219; 60/337, 347, 357, 366, 329, 436, 60/445, 465; 137/116.3; 251/117

See application file for complete search history.

(56) References Cited

U.S. PATENT DOCUMENTS

| 3,659,687 | A | * | 5/1972 | Edmunds | 192/3.34 |
| 3,814,221 | A | * | 6/1974 | Fuehrer | 192/3.34 |
| 3,863,739 | A | * | 2/1975 | Schaefer et al. | 188/296 |
| 4,324,320 | A | * | 4/1982 | Spurlin et al. | 188/271 |
| 4,827,806 | A | * | 5/1989 | Long et al. | 477/131 |
| 4,881,625 | A | * | 11/1989 | Redelman | 188/290 |
| 4,917,140 | A | * | 4/1990 | King et al. | 137/116.3 |
| 5,000,300 | A | * | 3/1991 | Klemen et al. | 188/294 |
| 5,101,941 | A | * | 4/1992 | Long et al. | 188/290 |
| 5,319,949 | A | * | 6/1994 | Long et al. | 60/347 |

* cited by examiner

*Primary Examiner*—Pam Rodriguez

(57) ABSTRACT

A hydrodynamic retarder control apparatus includes two valve spools, one, a retarder control valve, functions as a relay valve to control the on/off operation of a hydrodynamic retarder and the other, a regulator valve, functions to control the regulation of pressure at the hydrodynamic retarder. During abnormal periods of operation of the regulator valve, the retarder control valve will also function as a pressure control valve thereby limiting the maximum pressure at the hydrodynamic retarder.

6 Claims, 3 Drawing Sheets

HYDRODYNAMIC RETARDER CONTROL APPARATUS

TECHNICAL FIELD

This invention relates to control valve apparatus and, more particularly, to control valve apparatus for hydrodynamic retarders.

BACKGROUND OF THE INVENTION

Commercial automatic transmissions generally include a hydraulic retarder or hydrodynamic retarder that is used during vehicle braking. These devices absorb energy during vehicle braking and thereby conserve the service brake of the vehicle particularly in downhill operations. The hydrodynamic retarder converts the energy of the driveline into heat and dissipates it using the transmission oil cooling system.

A typical retarder control system consists of a flow valve to direct oil to and from the retarder and a regulator valve to control the pressure in the retarder cavity. The regulator valve generally controls the discharge oil from the retarder. By controlling the retarder pressure, the energy dissipation is also controlled.

These systems work very well under normal operating conditions; however, it is possible for the regulator valve to remain in the open or regulating position due to contamination or other elements that might be found in the fluid. With this occurring, the retarder cavity can be subjected to higher than needed pressures, which results in higher than normal absorption of energy and higher oil temperatures.

In many of the current retarder controls, it is common to use a relay valve to conduct fluid from the regulator valve to the retarder flow valve. The relay valve is a conventional off-on valve that does not affect the pressure within the system.

SUMMARY OF THE INVENTION

It is an object of this invention to provide an improved hydrodynamic retarder control system wherein the regulator valve is assisted by a multi-function valve to prevent excess pressures within the retarder cavity.

In one aspect of the present invention, the hydrodynamic retarder control apparatus includes a retarder multi-function valve and a retarder regulator valve.

In another aspect of the present invention, both of the valves are subjected to retarder discharge or retarder out pressure.

In yet another aspect of the present invention, the retarder regulator valve functions to control the pressure during the entire operation under normal conditions.

In still another aspect of the present invention, the retarder multi-function valve serves to both energize the retarder system by controlling the retarder flow valve and also by regulating the retarder output pressure in the event of a malfunction in the retarder regulator valve.

DESCRIPTION OF AN EXEMPLARY EMBODIMENT

Figure 1:
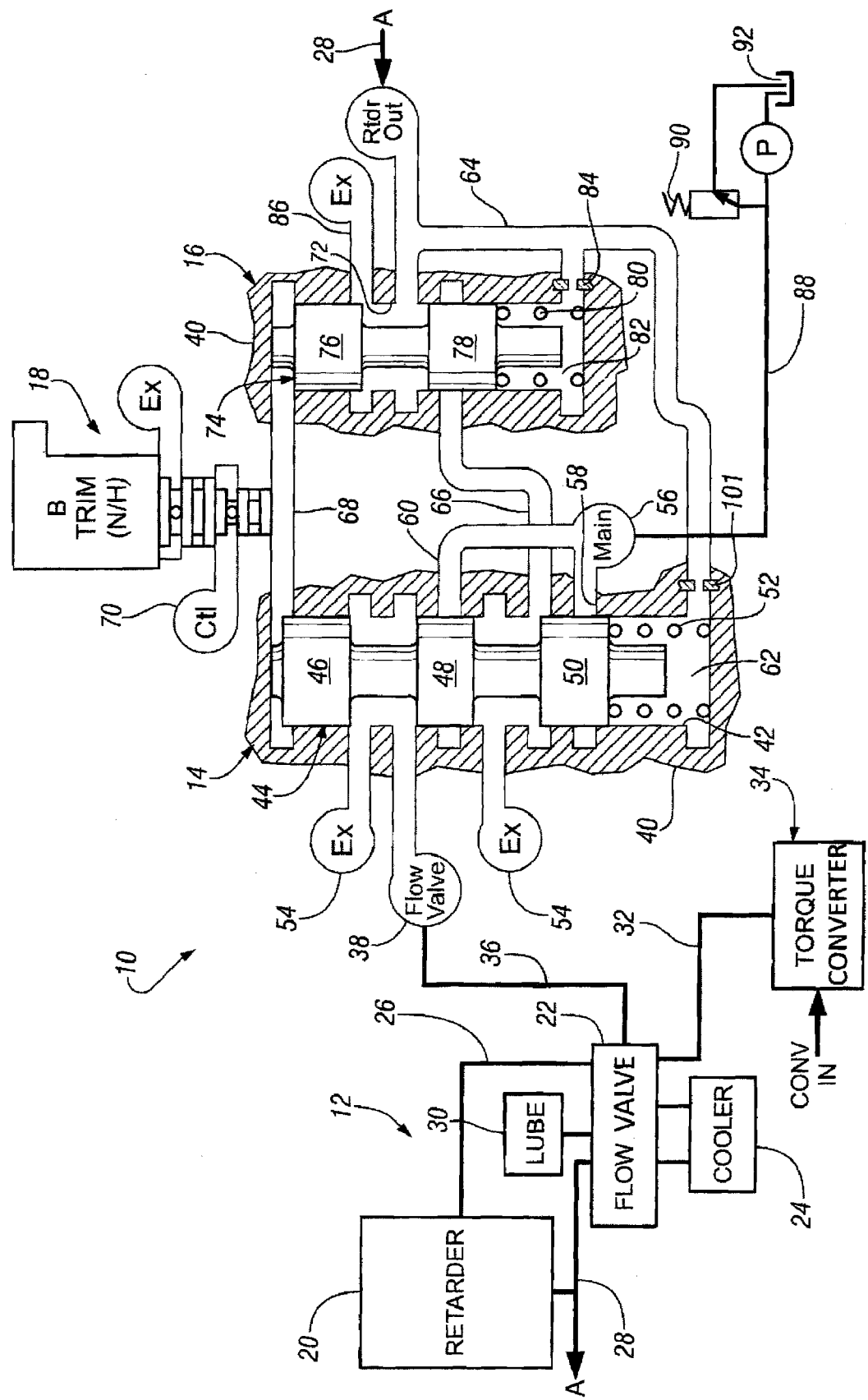
FIG. 1 is a schematic representation partly in block diagram form showing the hydraulic retarder control apparatus.

Referring to the drawings, wherein like characters represent the same or corresponding parts throughout the several views, there is seen in FIG. 1 a hydrodynamic retarder control apparatus 10 having a hydraulic retarder system 12, a retarder multi-function valve 14, a retarder regulator valve 16, and a trim control valve or solenoid 18.

The hydrodynamic retarder system 12 includes a conventional hydrodynamic retarder 20, a flow valve 22, and a cooler 24. The flow valve 22 is a conventional on/off valve, which controls distribution of fluid from an accumulator, not shown, to a retarder inlet passage 26. The hydrodynamic retarder 20 also has an outlet passage 28, which distributes fluid through the flow valve 22 to the cooler 24 from which it returns back into the flow valve for distribution to passage 26. The flow valve 22 also distributes a portion of the fluid to a lubrication circuit 30. The flow valve 22 also receives fluid from a passage 32, which communicates with a conventional torque converter 34 such that the torque converter output flow passes through the flow control valve 22. The oil from the torque converter 34 generally flows to the transmission sump cooler and also to the lubrication circuit 30.

The flow valve 22 communicates through a passage 36 with a flow valve port 38 formed on the retarder multi-function valve 14. The retarder multi-function valve 14 includes a valve body 40 in which is formed a valve bore 42 and a valve spool 44 slidably disposed within the valve bore 42. The valve spool 44 has three equal diameter lands 46, 48, and 50 disposed along the length of the valve spool 44. The valve spool 44 is urged in the upward direction shown in FIG. 1 by a spring 52. The valve body 40 includes the port 38, two exhaust ports 54 and a main pressure passage port 56. The main pressure passage port 56 distributes fluid through two passages 58 and 60 to the valve bore 42. As seen in FIG. 1, the main passage 58 is blocked by the land 50 and the main passage 60 is blocked by the land 48 when the valve spool 44 is disposed in the spring set position.

The spring 52 is disposed in a spring pocket or chamber 62, which is communicated with a passage 64. The valve bore 42 also communicates with a passage 66 and with a passage 68. The passage 68 is a control pressure passage, which is subjected to control pressure issued by the solenoid valve 18. The solenoid valve 18 accepts control oil from a passage 70 and distributes a control pressure to the passage 68 in a well-known manner.

The regulator valve 16 is also disposed in the valve body 40 and includes a valve bore 72 in which is slidably disposed a valve spool 74. The valve spool 74 includes two spaced lands 76 and 78. The lands 76 and 78 are smaller in diameter than the lands 46, 48, and 50.

As seen in FIG. 1, the valve spool 74 is urged upward by a control spring 80 disposed in a spring chamber 82. The spring 80 and the spring 52 each have the same preload and spring rate for reasons, which will become apparent later. The valve bore 72 communicates with the passage 64 through a restriction or orifice 84 and with the space between the valve lands 76 and 78. The passage 64 communicates with a retarder out port, which is communicating with the passage 28. The valve bore 72 communicates with the passage 66, which is blocked by the land 78 in the spring set position shown of the valve spool 74. The valve bore 72 also communicates with an exhaust port and passage 86. In the spring set position shown for the valves 14 and 16, the retarder 20 is inoperative from a braking standpoint.

The main passage 56 communicates with the system pressure for a transmission control, not shown, wherein fluid is supplied by a pump P for distribution through a main passage 88. The pressure in the main passage 88 is controlled by a conventional regulator valve 90, which passes excess fluid back to a transmission sump 92.

Figure 2:
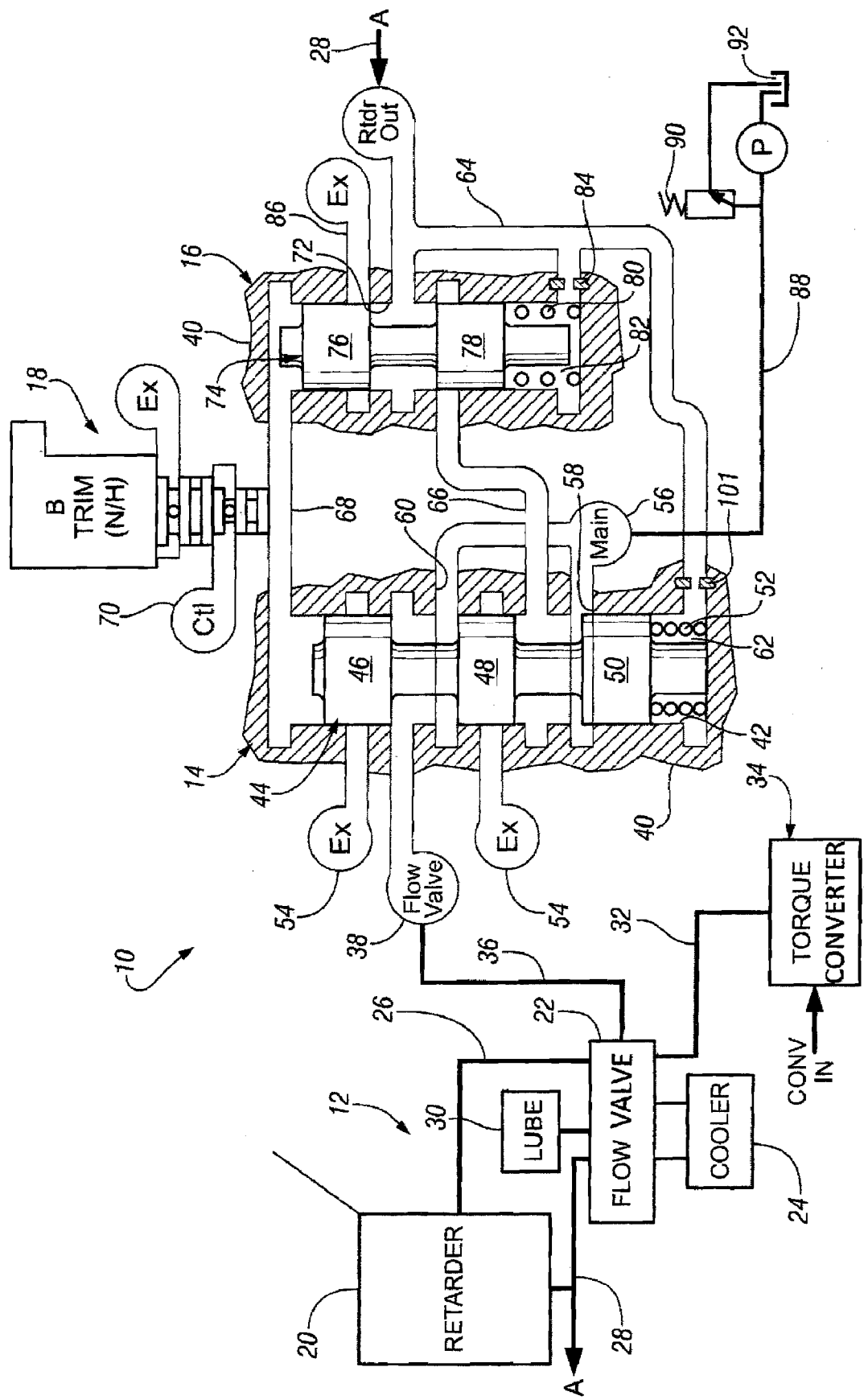
FIG. 2 is a schematic representation of the retarder multi-function valve and the retarder regulator valve shown in the normal operating condition.

As seen in FIG. 2, the multi-function valve 14 is energized, as is the regulator valve 16. This regulation is presented by pressure from the solenoid 18 to the passage 68. Pressure in passage 68 operates on the end of valve land 46 of valve spool 44, and valve land 76 of valve spool 74. When pressure reaches a sufficient level, the valve spool 44 is moved against the spring 52 to the pressure set position shown in FIG. 2, and fluid pressure in the main passage 56 is distributed to the flow valve port 38. As seen in FIG. 1, fluid pressure at the flow valve port 38 causes the flow valve 22 to open and distribute pressure to the retarder 20 such that hydrodynamic retardation of the vehicle is present.

As the hydrodynamic retarder 20 operates, fluid is returned from the retarder through the passage 28. This fluid is directed to both spring chambers 62 and 82 where it acts on lands 50 and 78, respectively. The fluid pressure in chamber 62 is not sufficient to overcome the bias pressure from the solenoid valve 18 operating on the land 46, however, the retarder outlet pressure operating on the chamber 82 assisted by the force in the spring 80 is capable of moving the valve spool 74 upward against the pressure in the passage 68. Thus, excess retarder outlet fluid is discharged to the exhaust port and passage 86. If the retarder outlet pressure decreases below that desired or recommended by the pressure in passage 68, the valve spool 74 moves downward against the spring 80 such that fluid from the main passage 56 passes between lands 76 and 78 to increase retarder outlet pressure thereby maintaining retardation force at the desired level.

Figure 3:
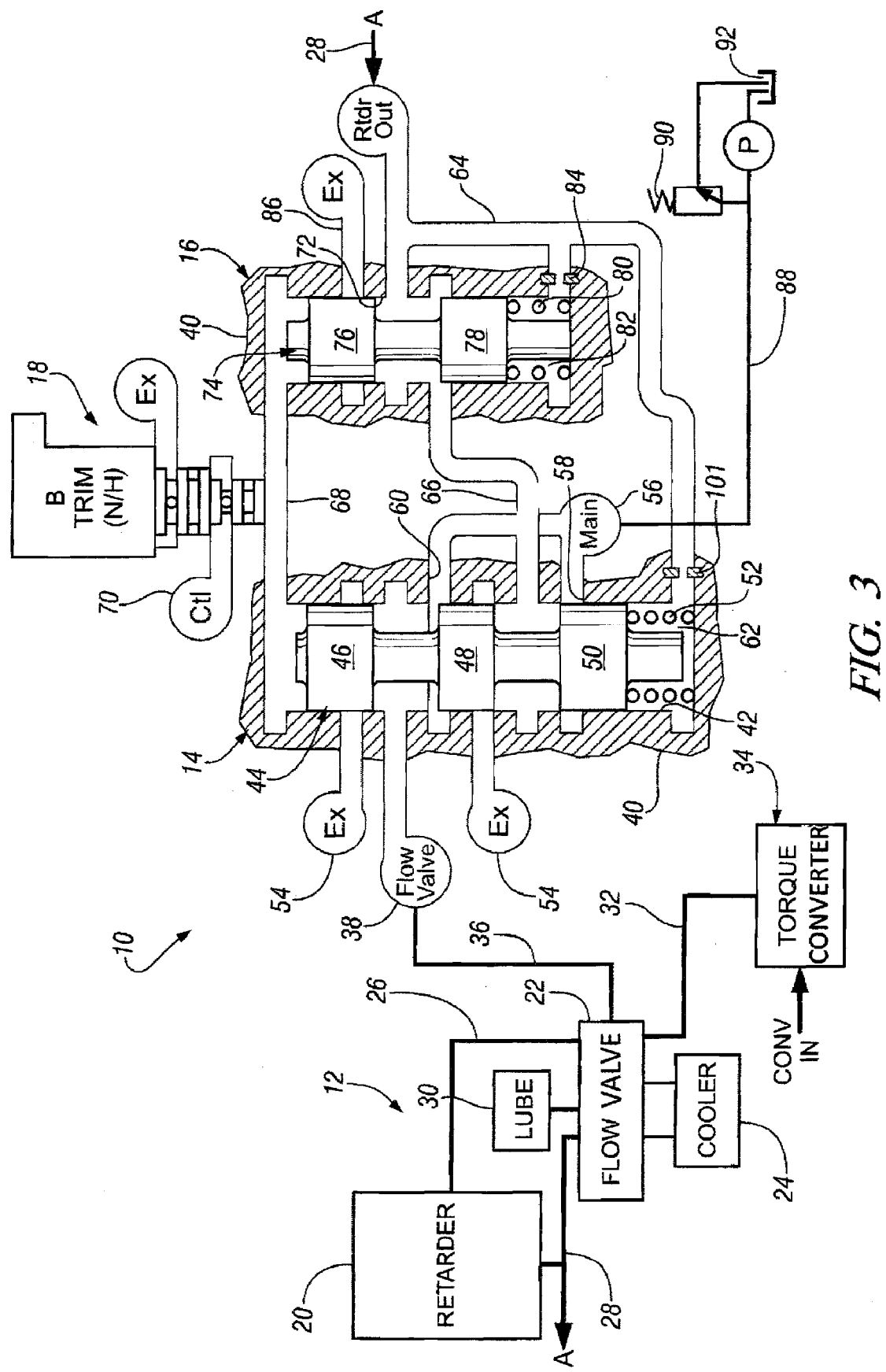
FIG. 3 is a view similar to FIG. 2 showing the regulator valve in a non-normal condition and the multi-function valve in a regulating condition.

As the operator requests an increase in retardation level, the solenoid valve 18 increases the pressure in passage 68 and vice versa. During normal operation, the regulator valve 16 responds to this pressure to control the retardation outlet pressure within a range as commanded by the operator. It is possible, although not desirable, for the regulator valve 16 to become inoperative and malfunction such that the regulator valve spool 74 is retained in the open position, as shown in FIG. 3.

When this occurs and the valve is in the position shown in FIG. 2, the main pressure from port 56 will enter the regulator outlet passage 28 thereby increasing the regulator outlet pressure and the braking present at the hydrodynamic retarder 20. In order to prevent excess retardation, the increased regulator outlet pressure is also acting in the chamber 62 on the valve land 50 and will reach a level sufficient to cause the multi-function valve 14 to overcome the control force in passage 68 when aided by the spring 52 to reduce the amount of main fluid which passes between the lands 48 and 50 to the regulator valve 16 between the lands 76 and 78. The retarder multi-function valve 14 thereby becomes a regulator valve to regulate the pressure found in the retarder outlet passage 28 and thus prevents the excess retardation force. The valve 14 will control the pressure in passage 28 within a pressure range that is higher than the pressure range normally established by the valve 16 under the control of the operator. The driver or operator will, of course, notice the change in retardation affect for a given brake operation and will be alerted to the fact that a correction is needed to the control mechanism.

During normal operation as described above, the valve 14 is effective to energize the flow valve at the retarder such that retardation of the vehicle will begin. During normal operation, the amount of retardation is controlled by the regulator valve 16 in response to the control pressure in passage 68. During normal functioning, the retardation will correspond to the operators braking effort which depends on the operators input. However, if the regulator valve 16 should not function properly resulting in the regulator valve 16 remaining open, the retardation force will increase for a given operator brake setting.

To prevent excess retardation, the valve 14 will take over as the regulator valve in the retarder outlet circuit thereby controlling the fluid pressure in the retarder at a level that is higher than normal but within an acceptable range. Orifice 101 provides a means of damping valve 14 in this mode of operation, similar to the function of orifice 84 on valve 16. By controlling the area of lands 46 and 76 and the forces in springs 52 and 80 through competent design, the pressure regulation of the valve 16 can be controlled within a range of 0 psi to 75 psi determined by the control pressure signal issued by the trim control valve 18 while the valve 14 will regulate within a pressure range of 10 psi to 85 psi Thus the pressure output of the valve 14 would be set to be 10 psi above the pressure expected at the valve 16. The range of both valves and the difference between the ranges is a design choice to be exercised by the designing personnel.

As pointed out above in the exemplary embodiment, the values for spring 52 and spring 80 are the same and the valve lands 46, 48, and 50 are larger than the valve lands 76 and 78. What is desired is that the combination of the spring 52 and the valve lands of valve spool 44 should respond to one force level generated at passage 68 while the valve lands of valve spool 74 and the spring 80 will respond to a different level of pressure. Also, as pointed above during normal operation, the combination of forces that are provided by the spring 80 and the valve land 76 result in the regulator valve operating within a desired range. The combination of spring 52 and valve land 46 cooperate to regulate the retarder outlet pressure in a range slightly higher than when the valve 16 is operating properly. The two valve mechanisms provide for substantially parallel pressure outlet functions with the pressure outlet function provided by valve 14, operating as a regulator valve, at a level higher than the pressure outlet function provided by the valve 16. During normal operation of the valve 16, the valve land 78 blocks the output of the valve 14 as seen in FIG. 2. It should now be apparent that the valve 14 provides both the function of a relay valve and a regulator valve.

The invention claimed is:

1. A hydrodynamic retarder control apparatus comprising:
a source of pressure;
a retarder having an inlet and a outlet;
a flow valve for controlling fluid flow to said inlet:
a regulator valve responsive to an operator demand to control the pressure within the retarder;
a multifunction valve connected with said source and being operable in response to the operator demand to supply control fluid to said flow valve and, in response to an abnormal operation by said regulator valve, to control the pressure within the retarder;
wherein said regulator valve and said multifunction valve each having a control spring having equal force and a control area wherein said control area of said regulator valve being smaller that the control area of said multifunction valve and said control area and control spring of said regulator valve control the pressure output thereof at a first predetermined range and said control area and control spring of said multifunction valve control the pressure output thereof at a second and higher predetermined range.

2. The hydrodynamic retarder control apparatus of claim 1 wherein the pressure output at the second and higher predetermined range is in excess of operator demand.

3. The hydrodynamic retarder control apparatus of claim 1 wherein the multifunction valve further includes a damping valve means for restricting flow from the outlet of the retarder to a spring chamber of the multifunction valve.

4. The hydrodynamic retarder control apparatus of claim 1 wherein the regulator valve further includes a damping valve means for restricting flow from the outlet of the retarder to a spring chamber of the regulator valve.

5. The hydrodynamic retarder control apparatus of claim 1 wherein the pressure output of the multifunction valve is regulated to a pressure range of about 10 to about 85 psi.

6. The hydrodynamic retarder control apparatus of claim 1 wherein the pressure output of the regulator valve is regulated to a pressure range of about 0 to about 75 psi.

* * * * *